UNITED STATES PATENT OFFICE.

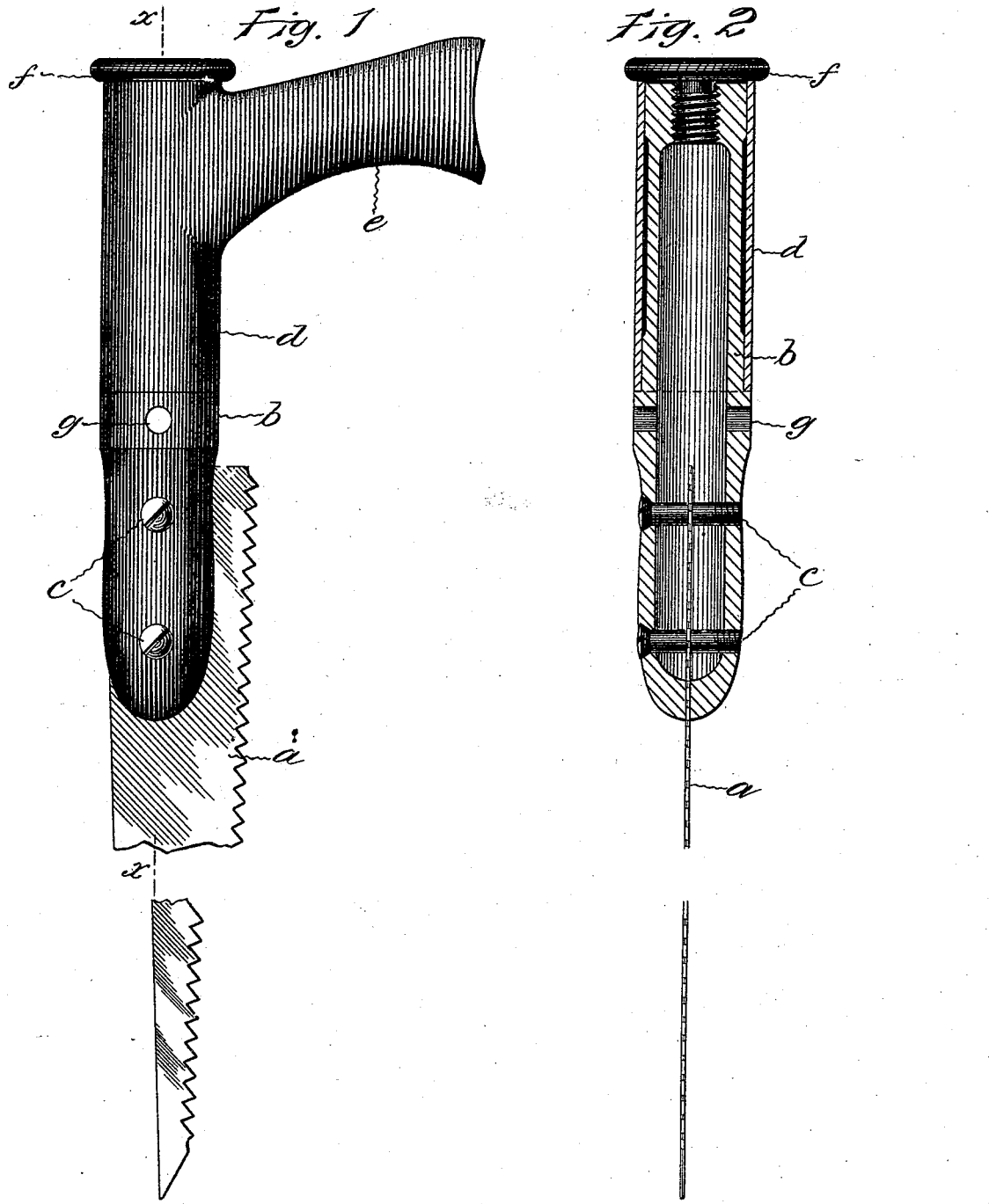

WALTER B. WHITE, OF NEW BRITAIN, CONNECTICUT.

COMPASS-SAW.

SPECIFICATION forming part of Letters Patent No. 552,342, dated December 31, 1895.

Application filed July 10, 1895. Serial No. 555,569. (No model.)

*To all whom it may concern:*

Be it known that I, WALTER B. WHITE, a citizen of the United States of America, residing at New Britain, in the county of Hartford and State of Connecticut, have invented a certain new and useful Improvement in Compass-Saws, of which the following is a description, reference being had to the accompanying drawings, wherein—

Figure 1 is a side view of the saw. Fig. 2 is a view of the same in section on the plane denoted by the dotted line $x$ $x$.

The object and purpose of the improvement is the production of a compass-saw with the handle so adjustable that the saw may be used in many places where it could not be otherwise used; and the invention resides in the parts hereinafter described and subsequently claimed.

In the accompanying drawings, the letter $a$ denotes the saw-blade and $b$ denotes the handle-base, preferably metallic. The butt-end of the saw-blade is socketed in a mortise formed in the end of the handle-base and therein secured by screws $c$.

The letter $d$ denotes a handle-sleeve which is rotatory upon the handle-base, so that the handle $e$, carried by the handle-sleeve, may be rotarily adjusted in any direction.

The letter $f$ denotes a male screw taking into the corresponding female screw made in the head of the handle-base. The upper end of the handle-sleeve projects slightly above the upper end of the handle-base and the under side of the head of the screw $f$ bears upon such upper end of the handle-sleeve; and it is the purpose and function of this screw $f$ to fasten the handle-sleeve and the handle-base in any desired position of rotary adjustment on the handle-base.

The edge of the saw is set so far forward of, or away from, that part of the handle-base which carries it, that in the operation of sawing the line of the teeth is well advanced and away from the handle-base and the handle-sleeve, a feature of construction which permits the saw to be used in ways or places where it could not otherwise be used.

The letter $g$ denotes a lever-socket for the insertion of a small round lever whereby to hold the handle-base stationary where it is desired to set the screw $f$ to place with extraordinary tightness.

I claim as my improvement—

The saw blade $a$, tubular handle base $b$ formed in one piece and slotted at the forward end to receive and embrace the said blade and clamped thereon by screws $c$ passing through blade and handle-base having at the other end a threaded recess, rotary handle sleeve $d$ carrying the handle $e$ susceptible of adjustment in any desired position and the screw $f$ threading into said recess with its head bearing on the end of the handle sleeve, substantially as described.

WALTER B. WHITE.

Witnesses:
W. E. SIMONDS,
ANDREW FERGUSON.